Aug. 26, 1952 H. MAGNUSKI 2,608,648

HIGHLY SELECTIVE RADIO RECEIVER

Filed March 23, 1948 2 SHEETS—SHEET 1

INVENTOR.
Henry Magnuski

BY Foorman L. Mueller

Atty.

Aug. 26, 1952 H. MAGNUSKI 2,608,648

HIGHLY SELECTIVE RADIO RECEIVER

Filed March 23, 1948 2 SHEETS—SHEET 2

*INVENTOR.*
Henry Magnuski
*BY*
Thomas L. Mueller
Atty.

Patented Aug. 26, 1952 2,608,648

UNITED STATES PATENT OFFICE 2,608,648

HIGHLY SELECTIVE RADIO RECEIVER

Henry Magnuski, Chicago, Ill., assignor to Motorola, Inc., Chicago, Ill., a corporation of Illinois Application March 23, 1948, Serial No. 16,575

7 Claims. (Cl. 250—20)

This invention relates generally to radio and television receivers and more particularly to a highly selective receiver system which is particularly suitable for mobile use and for frequency modulation reception. Reference is made to applicant's copending application, Serial No. 155,746, filed April 13, 1950, which is a continuation in part of this application.

As the use of mobile radio communication equipment has been expanding greatly and as only certain limited frequency bands are available for such mobile communication use, it is desirable to operate different communication systems on closely adjacent frequencies in order to permit simultaneous communication by the various parties who desire to use mobile radio equipment. The Federal Communication Commission has set up channels for mobile communications but the equipment now available does not permit simultaneous operation in a given area on all channels without interference as the equipment is not sufficiently selective to prevent interference between adjacent channels. Actually operation on alternate channels has not been satisfactory in many cases because of the interference between channels which are spaced by that amount. The need for selectivity is particularly acute in the mobile receivers, since the mobile unit often finds itself close to a powerful transmitter working on some adjacent channel and has to receive a weak signal in the presence of the very strong undesired signal emitted by this nearby transmitter. Thus the ratio of undesired to desired signal may be much higher for a mobile receiver than in a well chosen permanent receiving installation.

The need for more complete and efficient utilization of channel space now present in mobile radio communication bands, appears likely to exist in other bands in the near future. For television use, for example, only thirteen channels are now assigned and in any locality operation is permitted only on alternate channels. As it appears likely that television facilities will expand, and as additional frequency bands are not available, operation on all assigned channels in certain localities will, no doubt, be desired. Although other factors such as transmitter stability and over-modulation affect use of adjacent channels, the improvement of receiver selectivity appears to be the most important factor.

An object of this invention is to provide a receiver in which the selectivity is sufficiently flat over the desired band and which drops off very suddenly on either side of the band to permit adjacent channel operation.

It is a further object of the present invention to provide a mobile communication receiver of commercially practicable construction which is highly selective, signal reduction in level of the order of 100 decibels or better on the edge of adjacent channels being desired.

A feature of this invention is the provision of a receiver in which the received radio frequency carrier wave is reduced to low frequency before being substantially amplified, is then selected at low frequency where selectivity is made much easier, and is thereafter amplified.

Another feature of this invention is the provision of a receiver in which the frequency of the carrier is reduced in two steps with a highly accurate crystal being used for the first conversion and a less accurate crystal used for converting the first intermediate frequency wave to a low frequency wave.

A further feature of this invention is the provision of a receiver in which the selectivity is obtained through a very sharp band pass filter operating at a center frequency which is of the order of two to ten times the frequency band to be passed by the filter.

Still another feature of this invention is the provision of a receiver in which the signal is amplified at low frequency after selection so that undesired signals are not unnecessarily amplified resulting in intermodulation and the desired signal can be effectively and economically amplified by simple circuits as by resistance coupled amplifiers, for example.

A still further feature of this invention is the provision of a frequency modulation receiver in which the frequency of the received wave is reduced to a low frequency and the modulating signal can be conveniently derived therefrom by a frequency counting system.

Further objects, features and advantages will be apparent from a consideration of the following description taken in connection with the accompanying drawings in which.

In practicing the invention there is provided a receiver which may be a frequency modulation radio receiver adapted for operation in the very high frequency range as, for example, the range from 152 to 162 megacycles. The receiver includes an antenna system for selecting signals of the desired frequency and two converter stages for reducing the frequency of the received modulated wave. The first converter stage is provided with a highly accurate crystal oscillator so that the first intermediate frequency will be very accurately obtained. The second converter stage also includes a crystal oscillator but as this oscillator is operating at a frequency of the order of 2 megacycles, slight errors in the frequency of the oscillator are not so important and, therefore, a crystal which is less accurate may be used. The carrier wave derived from the second conversion is a low frequency wave of the order of 100 kilocycles. As it is desired to obtain a band width of approximately 40 kilocycles, this low frequency can be applied to a very sharp band pass filter operating at 100 kilocycles plus or minus 20 kilocycles to provide the required band width. It is well known that selectivity is made much easier at low frequencies and particularly where the band width is of the same order of magnitude as the frequency being selected. The filtered low frequency carrier wave is then amplified in a simple amplifier and signals corresponding to the modulating signals are derived therefrom by the use of clippers and a frequency counter system which operates in a well known manner.

Figure 1:
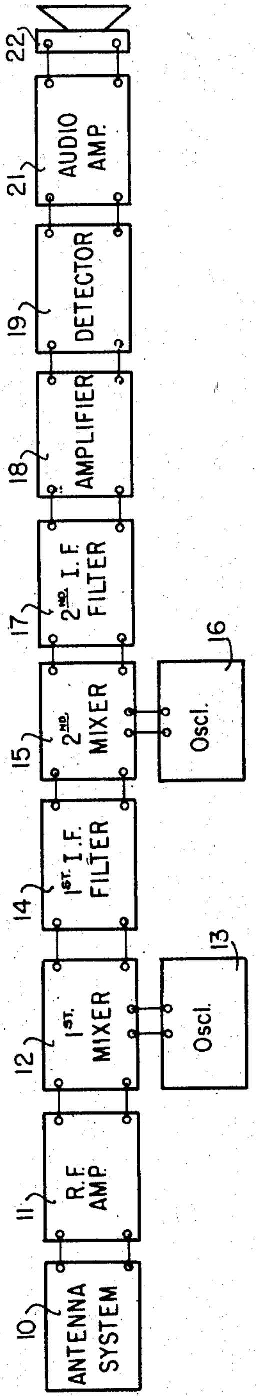
Fig. 1 is a block diagram illustrating the principle of operation of the receiver in accordance with the invention.

Referring now to Fig. 1, the receiver in accordance with the invention is illustrated as including an antenna system 10 which may be of any suitable construction, it being desirable that the antenna system be as highly selective as possible. A radio frequency amplifier 11 is provided for increasing the signal strength of the signals picked up by the antenna system and for further selecting the signals received. It is to be pointed out that it is not desired to increase the gain of the signal greatly in the radio frequency stage as this would result in increasing the signal strength of undesired signals, and it is merely desired to provide sufficient signal strength to provide a usable signal of such a level that the noise inherently introduced by subsequent converter and amplifier tubes will be unobjectionable —being much lower than the signal. The signal is then applied to the first mixer or converter 12 wherein the received signal is mixed with a very high frequency wave provided by oscillator 13 to provide a signal of the first intermediate frequency. As the oscillator 13 operates at very high frequency, an accurate crystal is required so that the frequency will be accurately controlled. It is especially necessary that the crystal be accurate since the crystal frequency may be multiplied several times in oscillator 13. The first intermediate frequency signal is passed through the intermediate frequency filter 14 and is then applied to a second mixer or converter 15 wherein the carrier wave is further reduced in frequency to a very low frequency such as 100 kilocycles. A second crystal oscillator 16 provides the mixing signal but as the crystal frequency is not multiplied and as certain frequency tolerance is permitted at this low frequency, the crystal need not be of high accuracy.

The resulting low frequency carrier wave is applied to filter 17 which may be a band pass filter of suitable standard construction. As the carrier wave will be frequency modulated by audio frequencies with the maximum deviation of the carrier about 20 kilocycles, a band pass of 40 kilocycles is sufficient to select the desired wave including the more important modulation side bands. A filter operating at about 100 kilocycles and having a band pass of approximately 40 kilocycles can be made to have very steep sides with the result that very high selectivity can be obtained. As previously stated the technique of designing filters having sharp cut-off, such as constant K and M-derived filters, when the band pass is of the same order of magnitude as the frequency selected is well known in the art. The filtered low frequency carrier is then applied to amplifier 18 which may be a simple very high gain amplifier increasing the signal level as much as 100 decibels. This provides a signal of sufficient magnitude that the audio modulating signal may be derived therefrom by detector 19. When used in a frequency modulated receiver, signal clipping and frequency counting circuits can be used, instead of the more conventional limiter and frequency discriminator circuit, as will be described more in detail. The resulting audio frequency signal can be amplified in the normal way in amplifier 21 and reproduced in sound reproducing device 22.

Receivers utilizing the principle described in connection with Fig. 1 have been constructed and found to be highly selective and entirely satisfactory in use. By keeping the amplification of the signal at a minimum in the radio frequency and intermediate frequency stages the undesired signals are not, therefore, increased in strength to make selectivity more difficult. It is, of course, obvious that as much selectivity as possible must be obtained in the antenna, radio frequency and converter stages and that sufficient gain must be provided in these stages to provide a workable signal, but the principal selectivity of the receiver is obtained after the carrier has been reduced to a low frequency where selectivity is much more easily accomplished and more sharply defined. The amplification of the low frequency wave after it has been selected and obtaining the modulating frequency therefrom may be very easily and efficiently accomplished.

Figure 4:
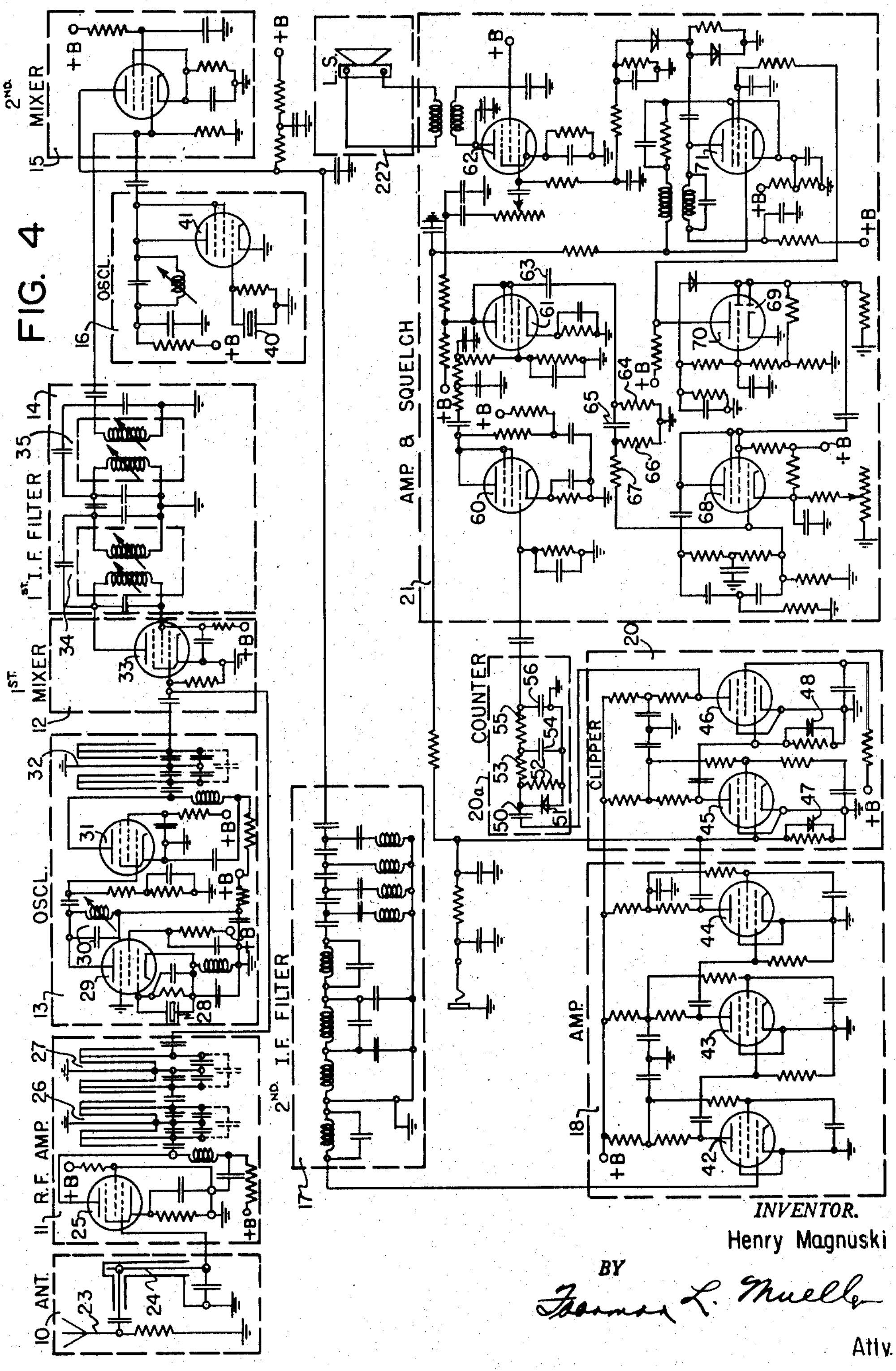
Fig. 4 is a detail circuit diagram of an example of a receiver in accordance with the invention.

Referring now to Fig. 4 in which a complete circuit diagram of the receiver in accordance with the invention is illustrated, it is noted that the signal is applied from the antenna 23 through a tuned transmission line 24 to the control grid of tube 25 of the radio frequency amplifier 11. The radio frequency amplifier includes two pairs of resonant line tuning circuits 26 and 27 connected to the output electrode of the tube 25 to further select the desired frequency. The first oscillator 13 includes a crystal 28 which controls the frequency of the oscillations in tube 29. The output circuit 30 of the tube 29 may be tuned to be resonant at three times the frequency of the crystal 28 so that the first oscillator stage is in effect a frequency tripler. The frequency of the crystal is further multiplied in tube 31 the output circuit of which is tuned by a resonant line tuning system 32 which may be tuned to three times the frequency of the circuit 30 to again triple the frequency of the crystal. It is noted, therefore, that the crystal frequency is multiplied by nine in the oscillator 13 so that any inaccuracies in the crystal will also be multiplied by this factor and would, therefore, be of substantial importance.

The signals from the radio frequency amplifier 11 and oscillator 13 are combined in mixer or converter 12 being simultaneously applied to the grid of tube 33 thereof. The resulting intermediate frequency signals are selected in the first intermediate frequency filter 14 which may consist of two pairs of tuned circuits 34 and 35 connected in the output circuit of the tube 33. The main purpose of the filter 14 is to reject the so called "image" frequencies which are the frequencies lying on the other side of the frequency of oscillator 16. If in our example the first intermediate frequency is two megacycles, the second intermediate frequency is 100 kilocycles and the oscillator 16 has a frequency of 1.9 megacycles the image frequencies will lie in the vicinity of 1.8 megacycles.

Figure 2:
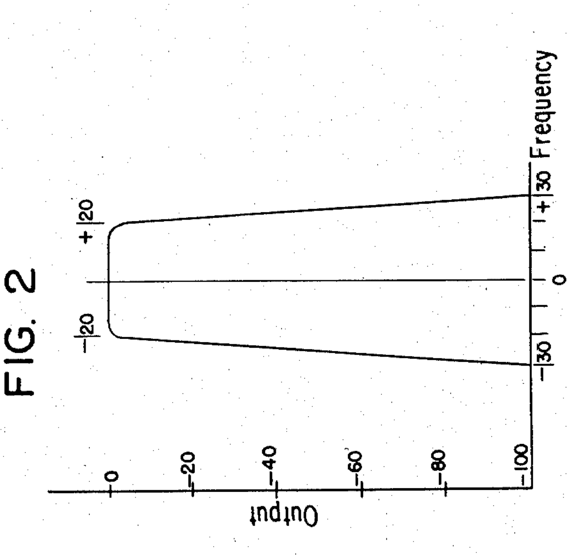
Fig. 2 is a curve chart illustrating the characteristics of the filter.

For further reducing the frequency of the carrier wave, a second mixer or converter 15 and oscillator 16 are provided. The oscillator 16 includes a crystal 40 which controls the frequency of oscillations within the tube 41. As the oscillator operates at a frequency of the order of 2 megacycles, a crystal operating at this frequency may be used so that multiplication of the frequency is not necessary. For this reason a crystal which is not highly accurate is suitable which, of course, reduces the cost of the crystal. The frequency of the oscillator 16 is combined with the intermediate frequency in the second mixer 15 to provide a low frequency of the order of 100 kilocycles. This low frequency carrier wave is applied from the second mixer 15 to filter 17 which may be a band pass filter having a relatively large number of sections. The specific construction of the filter 17 is not a part of this invention as such filters are well known in the art, but it is to be pointed out that a filter having very sharp sides as illustrated in Fig. 2 should be used. As the frequency being selected is of the same order of magnitude as the band pass of the filter, approximately 100 kilocycles and 40 kilocycles, respectively, very sharp cut-off can be obtained using known design techniques. The filter 17, therefore, may exclude all frequencies differing by a predetermined amount such as 20 kilocycles (plus and minus) from the low frequency carrier wave.

The low frequency carrier wave is then amplified in amplifier 18 which is illustrated in Fig. 4 as including tubes 42, 43 and 44 to provide three stages of amplification. As the amplification is accomplished at low frequency, an inexpensive resistance coupled amplifier not requiring tuned circuits and high transconductance tubes can be used. By the use of three stages in which high gain is obtained, it is possible to increase the level of the signal in the order of 100 decibels. This is sufficient to provide a low frequency wave of the required strength for obtaining the modulating signal therefrom.

Figure 3:
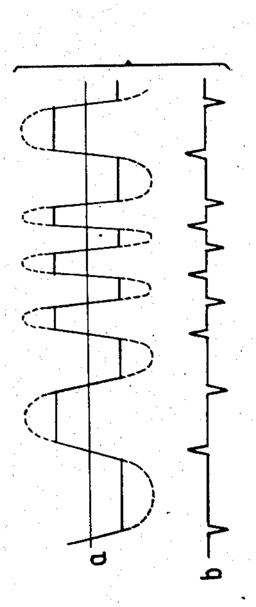
Fig. 3 is a plurality of curves showing the operation of the frequency counter.

For obtaining the modulating signal from the low frequency wave, clipper 20 and frequency counter 20*a* are provided. The clipper includes tubes 45 and 46 which limit the positive and negative portions of the wave, respectively. Crystals 47 and 48 are provided in the grid circuits of the clippers 45 and 46 for squaring the waves derived therefrom. This is illustrated in Fig. 3*a* in which the low frequency wave from the amplifier is shown in dotted lines and the square wave output from the clipper is shown in solid lines. The output of the clippers is applied to the frequency counter 20*a* which produces an audio frequency wave corresponding to the frequency deviation of the square wave applied thereto. This is accomplished by applying the square wave through a very small condenser 50 which differentiates the wave to provide pulses at each rising and falling portion of the square wave. Negative pulses are provided when the wave falls and positive pulses are provided when the wave rises as illustrated in Fig. 3*b*. The negative pulses are removed by rectifier 51 and the voltage of the positive pulses is averaged in resistor 52 to provide a voltage which is proportional to the frequency of the positive pulses. It is obvious that this corresponds to the amplitude of the audio modulating wave. The audio signal from resistor 52 is then filtered by a two-section filter including resistors 53 and 55 and condensers 54 and 56.

The audio frequency signal is then applied to audio amplifier 21 wherein the level is increased to provide signals for the sound reproducer 22. The audio amplifier is illustrated as including three stages provided by tubes 60, 61 and 62. The amplifier includes a squelch system for blocking the power amplifier tube 62 when a signal is not being received. This is accomplished by selecting noise which is above the audio frequency range by a filter comprised of condensers 63 and 65 and resistors 64, 66 and 67. The noise signals are amplified in tube 68 and rectified in the diode section 69 of tube 70. The resulting D. C. control voltage is amplified in the triode section of the tube 70 and applied to the grid of tube 71 which functions as a squelch oscillator. The output of the oscillator is applied to the control grid of the audio output amplifier 62 to block the amplifier when noise is received and there is no signal. This type of squelch circuit is described and claimed in my Patent No. 2,409,139, issued October 8, 1946.

As previously stated, receivers in accordance with the invention have been constructed and are found to have very desirable response characteristics. The over-all response characteristic of a receiver very closely resembles the characteristics of the filter as shown in Fig. 2. It is noted that the band width is 40 kilocycles for a strong signal to thereby provide high fidelity reception and is only 60 kilocycles when receiving a signal 100 decibels down. As the assigned channels in the very high frequency range are 60 kilocycles wide, it is apparent that the receiver is sufficiently selective so that simultaneous operation can be had on adjacent channels. The spurious responses of the receiver are all at least 100 decibels down so that no difficulty with interference is encountered.

The receiver in accordance with the invention is entirely suitable for mobile communication use and, although the receiver requires a relatively large number of tubes, it is not substantially more complicated than presently available high quality receivers which are not sufficiently selective to permit operation on adjacent channels. The selectivity is obtained by using two filters 14 and 17, which can be factory preadjusted before they are included in the receiver thus guaranteeing a suitable selectivity curve without requiring the adjustment and readjustment of several tuned intermediate frequency circuits at the end of production and in the field as in standard receivers. Amplification is obtained by using low conductance, low drain tubes thus decreasing the cost of the receiver. Finally the use of an inexpensive crystal in the second oscillator reduces the cost of the receiver without reducing the quality so that the advantages of two crystal controlled conversion stages are obtained and the cost is not substantially greater than with systems using only one crystal controlled oscillator.

Although the receiver system has been described in connection with a frequency modulation communications receiver, the system described is also advantageous in other receivers such as broadcast frequency modulation receivers, amplitude modulation receivers and television receivers. In each case the center frequency of the filters and the band pass thereof depend upon the carrier frequencies used and the band of frequencies transmitted. Rejection of the image frequencies is made easier when the intermediate frequencies are made large but the band pass characteristics of the intermediate frequency filters is better when the intermediate frequencies are low. In a communications receiver as described operating at 160 megacycles, the first oscillator may be at 158 megacycles providing a first intermediate frequency of 2 megacycles. The first image frequency will then be 156 megacycles and the tuned radio frequency circuits must be selective enough to pass 160 megacycles and reject 156 megacycles. The second oscillator may then operate on 1.9 magacycles to provide a second intermediate frequency of 100 kilocycles. The second image will be 1.8 megacycles which must be rejected by the first intermediate frequency filter which is tuned to pass 2.0 megacycles.

It is apparent that image rejection would be improved by increasing the intermediate frequencies but, as stated above, the selectivity of the filters would be then decreased. In a communications receiver as above described a band pass of 40 kilocycles is required as the permitted deviation in this band is plus or minus 20 kilocycles. The second intermediate frequency should preferably be between 1.5 and 10 times the band pass and, therefore, the intermediate frequencies should be kept low. The band pass of the filter depends upon the type of modulation used and the frequency range of the modulating signal. The width of the bands which must be passed by the selective filters in order to include all the carrier frequencies which include intelligence of the modulating signals for various types of systems are listed below:

| Amplitude Modulation Systems | Filter Band Pass |
|---|---|
| | kc. |
| Broadcast Quality 50-4,500 C. P. S. | 9 |
| High Fidelity 30-7,500 C. P. S. | 15 |
| Very High Fidelity 15-15,000 C. P. S. | 30 |

| Frequency Modulation Systems | Deviation | Filter Band Pass |
|---|---|---|
| | kc. | kc. |
| Broadcast 88-108 mc. | ±75 | 150 |
| Communication 30-40 mc. | ±15 | 30 |
| Communication 152-162 mc. | ±20 | 40 |

| Television | Filter Band Pass |
|---|---|
| | mc. |
| Black and white including sound | 5 |
| Color television | 15 |

In a high fidelity amplitude modulation receiver for broadcast and short wave reception a first intermediate frequency filter of 4.3 megacycles and a second intermediate frequency filter of 150 kilocycles would be suitable. A band pass of 15 kilocycles would be suitable for such a receiver. The audio frequencies would be derived by a regular amplitude modulation detector instead of the clippers and frequency counter. For television reception, only one intermediate frequency filter centered at approximately 10 megacycles and with a band pass of approximately 5 megacycles could be used.

While I have described one embodiment of my invention which is illustrative thereof, it is apparent that various changes and modifications can be made therein without departing from the intended scope of the invention as defined in the appended claims.

I claim:

1. A receiver for deriving modulating signals from a modulated carrier wave including in combination, means for converting said carrier wave to a low frequency carrier wave without substantial amplification of said wave, a passive band pass filter coupled to said converting means for selecting said low frequency wave, said filter being of such construction to pass the frequency of said low frequency wave and frequencies differing therefrom up to substantially 20 kilocycles and to substantially attenuate all other frequencies, means coupled to said band pass filter for amplifying said filtered low frequency wave without further selecting the same, said amplifying means comprising a resistance coupled amplifier, and means coupled to said amplifying means for deriving said audio frequency signals from said low frequency wave.

2. An electromagnetic wave receiver having an antenna for receiving modulated carrier waves in a range of frequencies which may include desired carrier waves and undesired carrier waves of greater intensity than the desired waves, with the receiver being responsive to a predetermined channel having a given bandwidth which includes the desired carrier waves and being substantially unresponsive to frequencies outside of but adjacent to the predetermined channel, said receiver including in combination, frequency changing and selecting means for reducing the frequency of the received carrier waves to produce intermediate frequency waves and for providing broad selection with respect to frequencies differing substantially from the frequency of the desired carrier waves, said frequency changing means including stages which hold the level of the received waves just above the level of noise produced therein, a single fixed passive band pass filter for selecting said intermediate frequency waves, means for applying said intermediate frequency waves from said frequency changing means to said filter at a level just above the level of noise, said band pass filter providing substantially all the selectivity of said receiver with respect to the predetermined channel and maintaining the amplitude of signals having frequencies extending over at least half of the bandwidth of the predetermined channel and attenuating the amplitude of all frequencies outside the predetermined channel by at least 80 decibels, means coupled to said filter for amplifying the selected intermediate frequency waves, and detecting means coupled to said amplifying means for deriving the modulating signals from the amplified waves, said amplifying means having a gain of at least 80 decibels and providing substantially the entire gain of said receiver in the portions thereof preceding said detecting means.

3. An electromagnetic wave receiver having an antenna for receiving modulated carrier waves in a range of frequencies which may include desired carrier waves and undesired carrier waves of greater intensity than the desired waves, with the receiver being responsive to a predetermined channel having a given bandwidth which includes the desired carrier waves and being substantially unresponsive to frequencies outside of but adjacent to the predetermined channel, said receiver including in combination, frequency changing and selecting means for reducing the frequency of the received carrier waves to produce intermediate frequency waves and for providing broad selection with respect to frequencies differing substantially from the frequencies of the predetermined channel, said frequency changing means including stages which held the level of the received waves just above the level of noise produced therein, a single fixed passive band pass filter for selecting said intermediate frequency waves, means for applying said intermediate frequency waves from said frequency changing means to said filter at a level just above the level of noise, said band pass filter providing substantially all the selectivity of said receiver with respect to the predetermined channel and maintaining the amplitude of signals having frequencies extending over at least half of the bandwidth of the predetermined channel and attenuating the amplitude of all frequencies outside the predetermined channel by at least 80 decibels, means coupled to said filter for amplifying the selected intermediate frequency waves, and means coupled to said amplifying means for deriving the modulating signals from the amplified waves, said amplifying means providing substantially all the amplification of said receiver preceding said last named means.

4. An electromagnetic wave receiver in accordance with claim 3 in which said frequency converting means produces intermediate frequency waves having a center frequency of not more than 10 times the bandwidth of the predetermined channel.

5. An electromagnetic wave receiver in accordance with claim 3 in which said frequency converting means includes first and second converter means, with said first converter means having an accurate crystal controlled oscillator and said second converter means having a crystal controlled oscillator of less accuracy, said frequency converting means providing intermediate frequency waves having center frequencies of the order of 2 to 10 times the frequency band of the predetermined channel.

6. An electromagnetic wave receiver in accordance with claim 3 in which said amplifying means comprises a resistance coupled amplifier.

7. An electromagnetic wave receiver in accordance with claim 3 in which said amplifying means comprises a multistage amplifier which provides substantially no further selectivity to the received waves.

HENRY MAGNUSKI.

REFERENCES CITED

The following references are of record in the file of this patent:

UNITED STATES PATENTS

| Number | Name | Date |
|---|---|---|
| 2,032,675 | Waller | Mar. 3, 1936 |
| 2,186,980 | Lowell | Jan. 16, 1940 |
| 2,263,634 | Landon | Mar. 30, 1940 |
| 2,282,092 | Roberts | May 5, 1942 |